(12) United States Patent
Grice et al.

(10) Patent No.: US 6,843,439 B1
(45) Date of Patent: Jan. 18, 2005

(54) ANTI-REVERSE BAIL CONTROL

(75) Inventors: Steven Grice, Spirit Lake, IA (US); Cameron Ivie, Lake Park, IA (US)

(73) Assignee: Pure Fishing, Inc., Spirit Lake, IA (US)

( * ) Notice: Subject to any disclaimer, the term of this patent is extended or adjusted under 35 U.S.C. 154(b) by 3 days.

(21) Appl. No.: 10/613,101

(22) Filed: Jul. 7, 2003

(51) Int. Cl.[7] ............................................. A01K 89/01
(52) U.S. Cl. ....................... 242/247; 242/231; 242/234; 242/257
(58) Field of Search ................ 242/247, 249, 242/257–262, 231, 232, 236, 295

(56) References Cited

U.S. PATENT DOCUMENTS

| | | | | |
|---|---|---|---|---|
| 4,614,314 A | * | 9/1986 | Ban | 242/248 |
| 5,788,172 A | * | 8/1998 | Rosa et al. | 242/240 |
| 6,123,280 A | * | 9/2000 | Yuen et al. | 242/247 |
| 6,247,663 B1 | * | 6/2001 | Matsuda | 242/231 |
| 2003/0150944 A1 | * | 8/2003 | Hong | 242/231 |

FOREIGN PATENT DOCUMENTS

| | | | | |
|---|---|---|---|---|
| DE | 4228332 A1 | * | 8/1992 | 242/231 |
| JP | 06-125683 | * | 6/1994 | 242/231 |
| JP | 06-205628 | * | 6/1994 | 242/231 |

* cited by examiner

Primary Examiner—Emmanuel M Marcelo
(74) Attorney, Agent, or Firm—Roylance, Abrams, Berdo & Goodman L.L.P.

(57) ABSTRACT

A spinning reel has a rotor assembly that is rotatable about the axis of a spool used to store fishing line. The rotor assembly contains a pivotable bail system which can be open or closed, to facilitate casting and retrieving, respectively, of the fishing line. The reel also contains a selective clutch. With the clutch in the "off" position the rotor assembly can be rotated in either direction. With the clutch in the "on" position and with the bail system closed, the rotor assembly can only be rotated in the line retrieving direction. The present invention allows the rotor to turn in either direction when the bail is moved from the closed position to a partially open position.

10 Claims, 3 Drawing Sheets

ANTI-REVERSE BAIL CONTROL

FIELD OF THE INVENTION

The present invention relates to clutch and rotor assemblies of a spinning reel, sometimes known as a "fixed spool" type of fishing reel.

BACKGROUND OF THE INVENTION

Spinning reels used for fishing have a spindle that is rotatable, axially displaceable, and mounted in a housing. A line spool is carried at one end thereof and secured in placed with various forms of releasable attachments. The line spool is not rotatably connected to the spindle and is axially fixed thereon. A drive shaft extending at right angles to the spindle is mounted in the housing to be rotated by a handle. Oscillating means are connected to the drive shaft and the spindle. When the handle is rotated for retrieving a fishing line fixed on the line spool, the drive shaft rotates and drives the oscillating means, in turn oscillating the spindle, and hence the line spool, in the longitudinal direction of the spindle. Through a gear transmission provided in the housing, the handle drives a hollow shaft which projects from the housing and is coaxial with the spindle extending through the shaft. By such a system, the drive handle is coupled to the spool to provide axial oscillation without rotation. See, U.S. Pat. No. 5,613,644 which is herein incorporated by reference.

The rotor assembly is rotatably mounted about an axially oscillatable spool whose axis rests in the same plane as the extended axis of the fishing rod. The rotation of a handle, whose rotational axis is perpendicular to the axis of the spool, is coupled, usually through gearing, to the rotation of the rotor assembly.

The rotor assembly is made with a housing and a bail system laterally positioned and pivotably mounted thereto. With the bail system in the "closed" position, tensioned line extending between the spool and the line guides is directed laterally into a smooth groove of a roller guide that is disposed on the bail arm. By rotating the rotor in one direction, the line is rotated around and wound onto the axially oscillating spool. Line under tension can be unwound from the spool by rotating the rotor in the opposite direction. The bail system is placed in the "open" position to disengage the bail system from the line and allow line to flow freely off the spool as is needed when casting.

Spinning reels also contain a clutch mechanism on the rotor assembly. The clutch has an engaged or "on" state which allow the rotor assembly to rotate only in the line retrieval direction or a disengaged or "off" state wherein the rotor assembly can rotate in either the winding direction or an unwinding direction. A lever or similar type of selector is usually provided for selecting between these two states.

The spool is mounted to the reel through a drag system that employs a series of drag washers to permit a frictionally retarded rotation about the spindle. Inter-washer friction is adjusted is smoothly variable by compression forces from a threaded drag knob, dial, ring, or lever. The purpose of the drag system is to provides frictional resistance against the rotation of the spool about the spindle axis. The amount of friction that is applied is adjusted by the angler so that, should the tension in the fishing line exceed the frictional force of the drag system, the spool will rotate and prevent the line from breaking.

For casting or other lure positioning purposes, an angler may wish to have precise control over the line length which is complicated by the conventional bail and clutch mechanisms. With the clutch in the "on" state, as is typically used to prevent unwanted release of line or over-rotation of the bail, line can only be removed from the spool by either opening the bail system (full release of line) or by pulling on the fishing line in an amount sufficient to overcome the drag setting. Opening the bail system does not allow a precise amount of line to be removed from the spool, and it can be difficult to pull against the drag system if the frictional force is set high. Adjusting the drag to a lower setting presents risks if not reset before a fish strikes the lure. Line can also be removed by switching the clutch lever from "on" to "off" to allow rotating rotor assembly to unwind line, but after adjusting the amount of line the angler must then remember to turn the clutch "on" before retrieving line again.

An angler may also find that casting is most easily performed with the rotor rotated to a specific degree. With the clutch in the "on" position, the angler can only rotate the rotor to this position in the direction that causes line to wind on the spool. It is possible that the lure will come in contact with the rod before the rotor reaches the desired location, preventing the angler from being able to cast properly. In this case, the angler must release line from the spool by opening the bail, pulling against the drag, or turning the clutch "off" to facilitate rotating the rotor assembly in the opposite direction. Each of these solutions may be cumbersome for the angler.

It would be desirable to have bail and clutch mechanisms for a spinning reel used in fishing that would allow anglers greater control over the unwinding of line from the reel without completely opening the bail system or turning the anti-reverse clutch to the "off" position.

SUMMARY OF THE INVENTION

The object of the present invention is to provide a rotor assembly and clutch which is so designed that it enables an angler to better control the position of the rotor or the amount of line between the rod and the lure.

It is a further object of the present invention to provide a fishing reel rotor assembly and clutch system that facilitates a simpler casting function for the angler.

According to these and other objects of the invention that will become apparent from the description herein, a spinning reel according to the invention comprises:

- a drive system comprising an axially extending, rotatable pinion and an axially oscillatable spindle,
- a fishing line spool coupled to said spindle and frictionally retarded against rotation relative to said spindle by a drag system,
- a bail assembly rotatably mounted to pivot about said spool between an "open" position in which said fishing line is freely removed from said spool (such as when casting) and a "closed" position for engaging said line and winding said line about said spool,
- a rotation clutch having an engaged or "on" state and a disengaged or "off" state so that when in said engaged state, said bail assembly may only rotate so as to wind tensioned line onto said spool in a winding direction, and when in said disengaged state said bail assembly may rotate in said winding direction or in an unwinding direction that allows tensioned line to be unwound from said spool, and
- wherein said bail assembly is coupled to engage or disengage said rotation clutch so that (a) said clutch is disengaged from said pinion at a partially open position located between said closed position and said open position, and (b) said clutch returns to said engaged state when said bail assembly is moved back to said closed position.

Fishing reels according to the invention provide anglers with a high degree of control and precision over lure position and line length. Partially opening the bail assembly temporarily disengages the anti-reverse clutch mechanisms to allow additional line to be unwound from the spool. Releasing the bail to return to its closed position will, however, re-engage the anti-reverse clutch mechanism to prevent unintended release of additional line.

DETAILED DESCRIPTION OF THE INVENTION

Figures 1, 2:
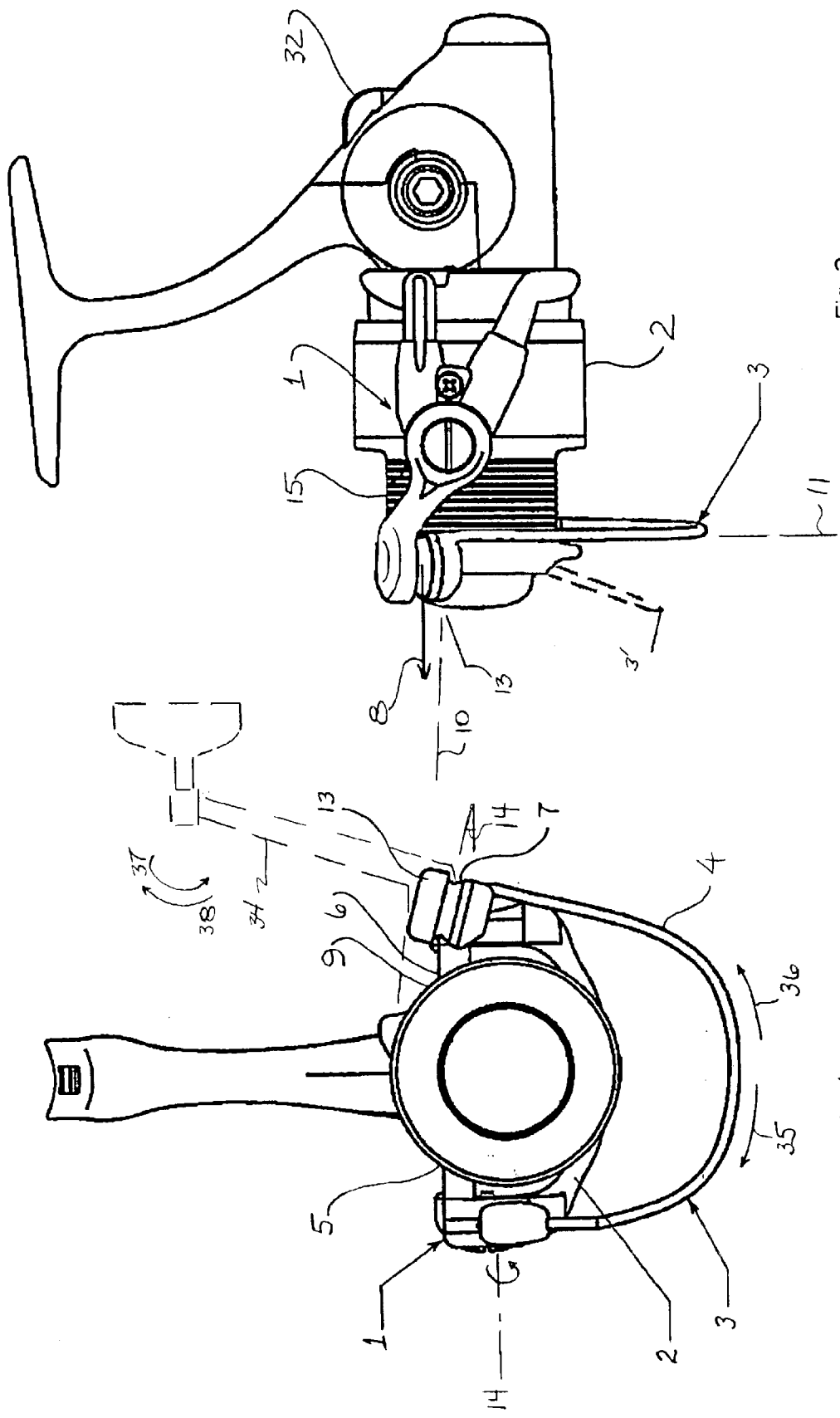
FIG. 1 is a front view of a partly illustrated spinning reel containing the present invention
FIG. 2 is a side view of the spinning reel in FIG. 1

The spinning reel shown in FIGS. 1–5 comprises bail assembly 3 that is pivotably mounted to housing 2 via rotor 1. Bail assembly 3 includes bail arm 4 extending from first side 5 of said housing 2 to second side 6 of said housing 2. Line guide roller 13 is mounted on bail arm 4 at second side 6 and has formed in the surface thereof a smooth groove 7 in a guiding arrangement with bail arm 4 so that fishing line 8 to be wound onto spool 9 is contacted by and guided across bail arm 4 into groove 7 as bail arm 4 is moved from an "open" position 10 into the "closed" position 11, as shown in FIGS. 1 and 2. Spool 9 is attached to axially oscillatable spindle 12 which is moved axially by oscillation gearing 16 as pinion 30 rotates as handle 34 is rotated.

From closed position 11, bail assembly 3 can be pivoted to partially "open" position 3' within the range of about 1–45 degrees, preferably about 5–20 degrees from its "closed" position via rotor 1. In this partially open position 3', groove 7 is still in guiding contact with fishing line 8 that extends from spool 9. Groove 7 is preferably inclined at an angle within the range of about 5–20 degrees relative to pivot axis 14 of bail assembly 3 and towards inner surface 15 of spool 9.

Figure 3:
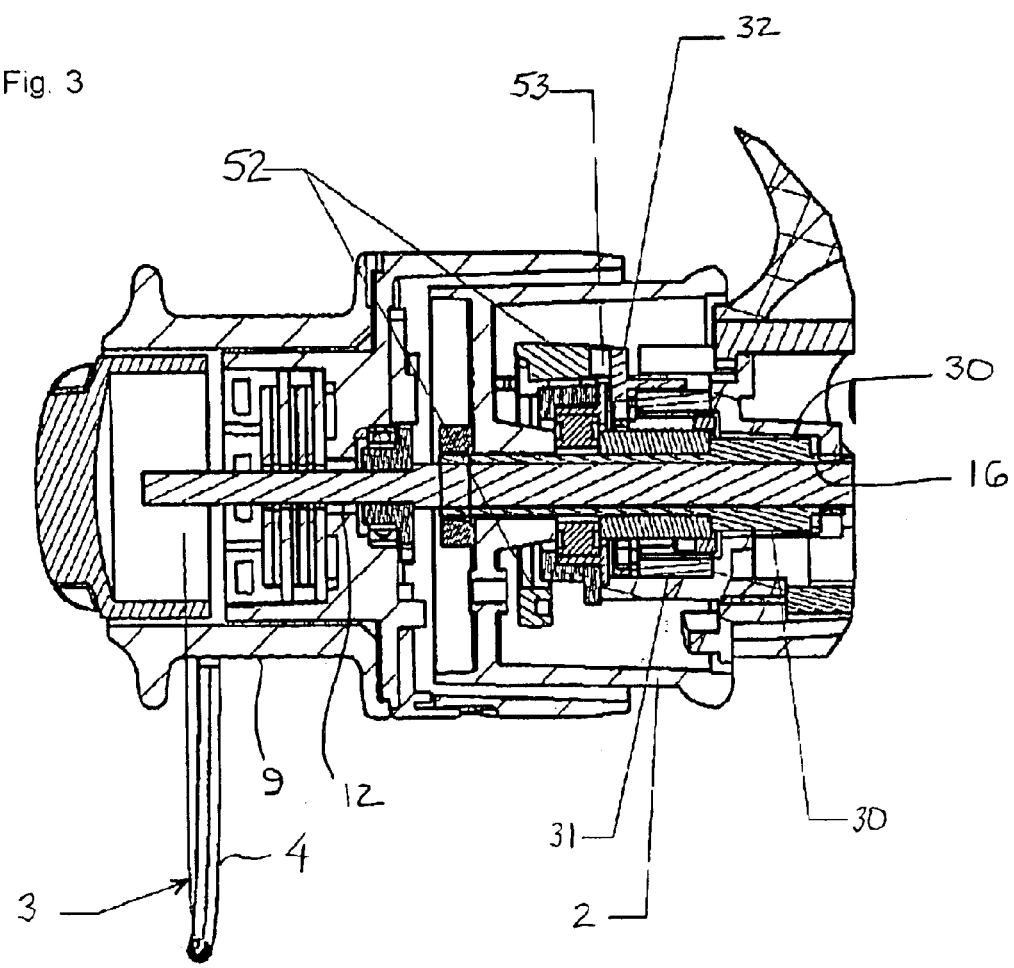
FIG. 3 is a partial cross sectional view through the center of the spinning reel in FIG. 1
Figure 4:
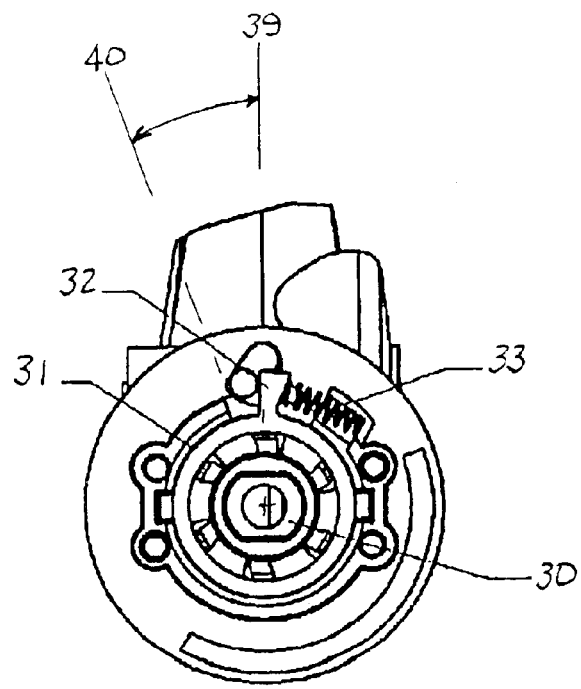
FIG. 4 is a partial front view of the body and clutch assembly of the spinning reel in FIG. 1
Figure 5:
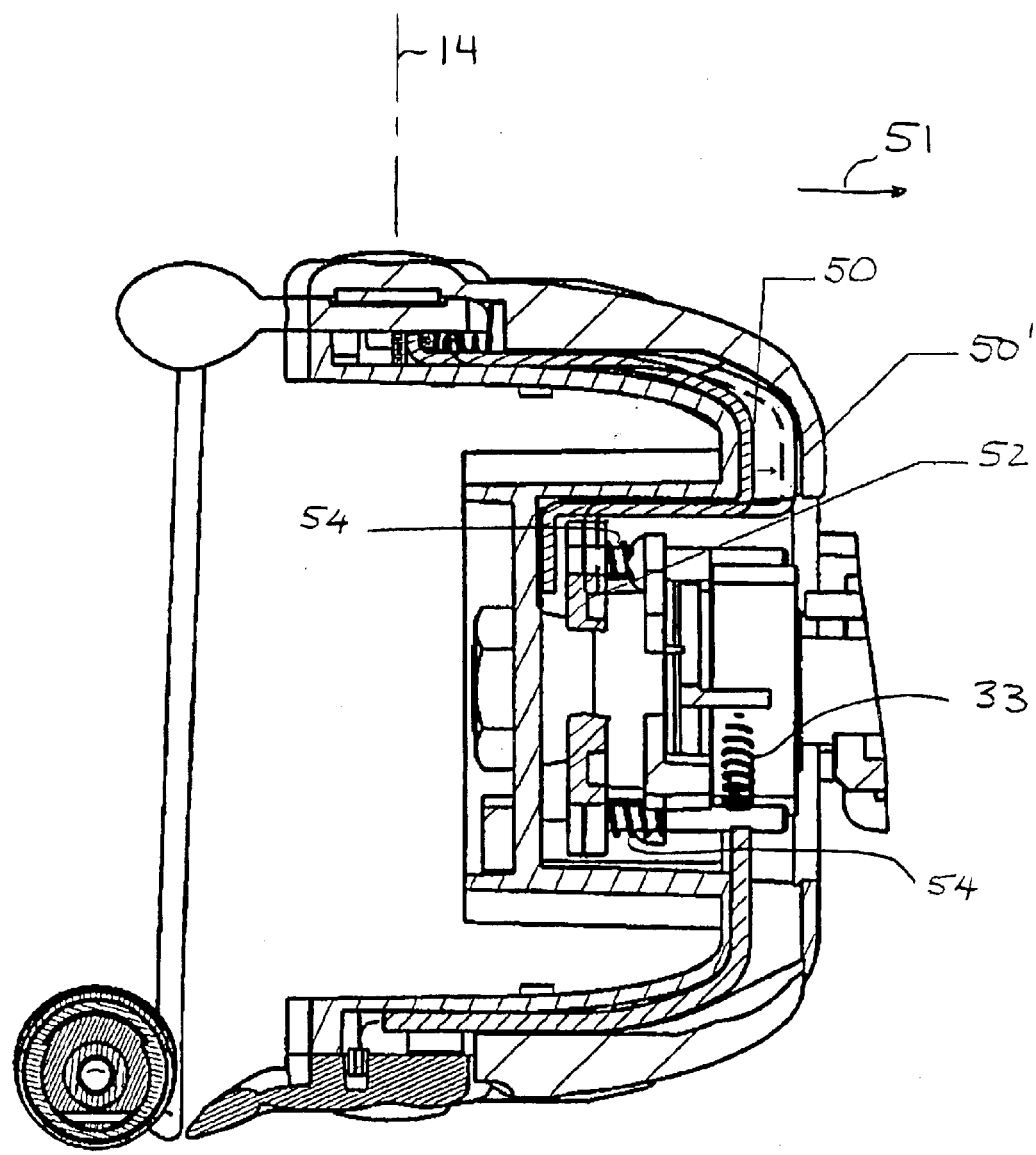
FIG. 5 is a cross sectional view showing only the rotor assembly and clutch of the reel in FIG. 1

Referring to FIGS. 3 and 4, pinion 30 can be engaged with anti-reverse clutch 31 which is capable of preventing the rotation of the pinion 30 in unwinding direction 36. Clutch 31 is typically configured so that it always permits rotation in winding direction.

Clutch 31 can include a conventional ratchet of one or more discrete steps or a stepless anti-reverse mechanism of the type shown in U.S. Pat. No. 6,123,280 which is herein incorporated by reference.

Clutch 31 also contains a radially extending actuation lever 32 which is biased by transverse spring 33. Under the influence of spring 33, lever 32 is urged towards engaged position 39 so that anti-reverse clutch 31 will be engaged with pinion 30. This arrangement is referred to as an engaged state or "on" position. When so engaged, pinion 30 will rotate only in winding direction 35 and will not rotate in unwinding direction 36.

In the context of the orientation shown in FIG. 1, winding direction 35 occurs when handle 34 is moved outwardly toward the viewer in a first direction 37 so that bail 3 rotates clockwise around spool 9. The unwinding direction 36 is counterclockwise with handle 34 rotating away from the viewer in second direction 38.

If lever 32 is moved from engaged position 39 and held against the bias force of spring 33 in disengaged position 40, clutch 31 will be in a disengaged state or "off" position. Pinion 30 may thereby rotate in either the winding direction 35 or unwinding direction 36. See, U.S. Pat. Nos. 4,927,094; 5,605,299; and 6,394,379 which are herein incorporated by reference.

The present invention modifies a conventional spinning reel bail and clutch assemblies by adding a linkage member between the bail assembly and anti-reverse clutch systems. The linkage member serves as a connection means for linking movement of the bail arm to the engagement or disengagement, depending on the bail arm motion, of the anti-reverse clutch and the pinion or drive shaft. Suitable linkage members can operate mechanically by axial or radial displacement or electronically by suitably positioned bail arm sensors and means for engaging or disengaging the clutch, e.g., solenoids, in response to a sensed change in bail arm position. Mechanical linkage members are preferred for durability and reliability under a wider variety of environmental conditions.

Also added by the present invention is a spring-bias on the clutch lever. The bias of the spring urges the lever to the engaged or "on" position so that partially opening the bail (i.e., to a position less than fully open) will disengage the anti-reverse clutch. The same spring bias will then force the clutch lever back to the engaged or "on" position when the partially open bail is closed. Use of an overtoggled spring about the lever pivot point allows the clutch lever to be disengaged completely and remain in the disengaged position until moved back to the engaged position by the angler.

Although described in the context of a lever switch, it will be understood by those in the art that functionally equivalent actuator systems can be used, e.g., sliding switches, rotating knobs, external rings, and the like.

In the present embodiment, the figures show a linkage member that is axially displaceable. Rotor assembly 1 contains a cam member 50 (FIG. 5) which is rotationally coupled to bail assembly 3 off-center from pivot axis 14 such that when bail assembly 3 is pivoted on pivot axis 14 to a partially open position, e.g., within 1–45 degrees to the partially "open" position 3', cam member 50 moves axially in rearward direction 51 to disengaging position 50' while also moving ring member 52 axially in the same direction. Axial springs 54 urge ring member 52 into forward position 55 in which clutch 31 is engaged with pinion 30. Transverse spring 33 also urges lever 32 into an engaged position.

Ring member 52 contains cam surface 53 which, when ring member 52 is axially displaced towards lever 32, cam surface 53 rotates lever 32 from engaged position 39 to disengaged position 40 causing clutch 31 to disengage or move to an "off" position relative to pinion 30. Thus, with bail assembly 3 pivoted within about 1–45 degrees to a partially "open" position 3', rotor assembly 1 can be rotated or allowed to rotate in both clockwise and counterclockwise directions 35, 36 while the fishing line 8 remains in contact with and guided by groove 7 of line roller 13. Such controlled unwinding movements allows the angler precise control over the amount of line released and when that line is released for better lure position, depth, and movements.

What is claimed is:

1. A spinning reel comprising: a drive system comprising an axially extending, rotatable pinion and an axially oscillatable spindle, a fishing line spool suitable for retaining an extended length of fishing line, said spool being coupled to said spindle, a bail assembly rotatably mounted to pivot about said spool with a rotor between an "open" position in which said fishing line is freely removed from said spool and a "closed" position for engaging said line and winding said line about said spool, a rotation clutch having an engaged or "on" state and a disengaged or "off" state so that when in said engaged state said bail assembly may only rotate so as to wind tensioned line onto said spool in a winding direction, and when in said disengaged state said bail assembly may rotate in said winding direction or in an unwinding direction that allows tensioned line to be unwound from said spool, and wherein said bail assembly is coupled to engage or disengage said rotation clutch so that (a) said clutch is disengaged from said pinion at a partially open position located between said closed position and said open position, and (b) said clutch returns to said engaged state when said bail assembly is moved back to said closed position.

2. A reel according to claim 1 wherein said reel further comprises a linkage member that is rotationally coupled to said rotor off-center of a pivot axis for said rotor.

3. A reel according to claim 2 wherein said linkage member is axially displaced as said bail assembly is opened.

4. A reel according to claim 3 further comprises an axially displaceable ring member that is axially displaced when said linkage member is axially displaced.

5. A reel according to claim 4 wherein said ring member further comprises a cam surface that engages an actuator linked to engage or disengage said rotation clutch.

6. A reel according to claim 5 wherein said ring member is spring-biased towards a position in which said clutch is engaged.

7. A reel according to claim 5 wherein said actuator is spring-biased towards a position in which said clutch is engaged.

8. A reel according to claim 5 wherein said actuator comprises a lever switch.

9. A reel according to claim 1 wherein said bail assembly comprises a bail arm in guiding alignment with a line guide roller.

10. A reel according to claim 9 wherein said line guide roller exhibits a smooth groove suitable for guiding fishing line onto said spool when said bail assembly is rotated in said winding direction.

* * * * *